UNITED STATES PATENT OFFICE 2,381,486

FLOOR COVERING DRYING OIL VEHICLE AND PROCESS THEREFOR

Samuel A. Cohen, Berkeley, Charles D. Thurmond, El Cerrito, and Lee S. Read, Piedmont, Calif., assignors to The Paraffine Companies, Inc., San Francisco, Calif., a corporation of Delaware No Drawing. Application March 3, 1942, Serial No. 433,156

3 Claims. (Cl. 260—101)

Our invention relates to floor covering vehicles comprising unsaturated oils of the so-called drying oil class which includes the semi-drying oils, and which may be animal as well as vegetable oils; and more particularly to modification of such oils to provide improved properties as a floor covering vehicle, especially for felt base floor covering print paints. In the following specification and claims, such oils are designated generically as "drying-oils," typical examples of which are corn, cottonseed, linseed, menhaden or fish, oiticica, perilla, sesame, soy-bean, and tung.

It is known, as is disclosed in Ellis Patents Nos. 2,033,131, dated March 10 1936, and 2,146,671, dated February 7, 1939, that oils of the class described may be reacted with certain unsaturated organic compounds containing the group,

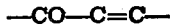
—CO—C=C— to produce more or less viscous or semi-solid artificial resins, and that the properties of such resins may be modified by including in the reaction among the oil and the unsaturated organic compound of the class described, substances such as polyhydric alcohols, and rosin or any other resin having a conjugated double bond. Examples of substances containing the desired —CO—C=C— group are aldehydes such as crotonaldehyde, maleic acid, fumaric acid, itaconic acid, citraconic acid, mesaconic acid, and the anhydrides of such acids which form anhydrides. Of such substances, maleic acid or its anhydride is preferred because of its more ready availability. Next in preference is fumaric acid.

Ellis Patent No. 2,063,542, dated December 8, 1936, discloses that substances of the type described, containing the —CO—C=C— group, may be reacted alone with a resin having conjugated double bonds, or may be reacted with such resin together with a polyhydric alcohol, to provide a "diene" synthesis, and produce so-called "diene" resins which are solid. Such substances containing the —CO—C=C— group, typical examples of which were previously mentioned, are employed in the composition and process of our invention and are generically designated herein as "double bonded diene reactive substances." The composition and process of our invention also embody conjugated double bond resins, typical examples of which are either gum or wood rosin, copal resin, congo resin, and dammar resin. Also, the composition and process of our invention may and preferably do embody alcohols, preferably polyhydric alcohols such as glycerol, glycols, polyglycols, polyglycerols, sorbitol, and mannitol.

In contradistinction to the compositions of the previously mentioned patents which are all solid or semi-solid resinous materials at room temperature, the compositions of our invention are essentially modified drying oils which are relatively non-viscous at room temperature, and are adapted for use as drying oil vehicles. In other words, the modified drying oils of our invention are not resinous materials in the sense that such materials are generally considered to be of a viscous or solid nature, but are relatively non-viscous, liquid substances that may be readily poured, stirred or pumped at room temperature.

We have found that if a reaction is effected among suitably proportioned quantities of a drying oil, double bonded diene reactive substance, and a conjugated double bond resin, by application of heat in the manner disclosed in the previously mentioned patents, the drying properties of such oil are increased compared to the unmodified oil, and in addition improved physical properties are imparted thereto, which result in a tougher and more flexible film than that obtainable from the unmodified oil having an equivalent quantity of unreacted resin incorporated therein. Because of such improvement, we have found the modified oil especially adapted for a floor covering drying oil vehicle where relatively tough and flexible films are desirable. The physical properties may be further modified by including an alcohol in the reaction.

As with respect to reactions of the character to which our invention relates, the proportions of the reacting substances may vary widely, depending upon the specific properties of the modified oil desired. However, in all of our compositions, the quantity of oil employed with respect to the remainder of the reacting substances is such as to leave the composition in a readily fluid or liquid state; and in this connection the drying oil constitutes a major proportion of our compositions which thus consist essentially of a drying oil modified by other substances entering into reaction therewith.

The double bonded diene reactive substance reacts with both the drying oil and the conjugated double bond resin. Of these substances, the product resulting from the reaction of the double bonded diene reactive substance and the conjugated double bond resin is what imparts increased hardness or toughness to the film resulting from drying of the modified oil when it is employed as a coating vehicle, compared to the toughness of the film resulting from an unmodified oil of the same character having an equivalent quantity of unreacted resin incorporated therein. The conjugated double bond resin when heated alone with the drying oil will produce no appreciable chemical effect thereon, other than that which would normally be expected by incorporation of a resinous material in a drying oil. For best results, there should be sufficient of the double bonded diene reactive substance to react with the conjugated double bond resin, and also provide an effective quantity for reaction with the oil.

When there is an excess of the conjugated double bond resin over the quantity necessary to react stoichiometrically with the double bonded diene reactive substance, some of the double bonded diene reactive substance will react with the drying oil, as well as with the resin, but there may be left an unreacted quantity of the resin which is undesirable because the free resin would not contribute in providing the desired toughness and hardness of the resultant film. If the quantity of drying oil is too great, then the reaction may become negligible because of the volume of oil; and if the quantity of double bonded diene reactive substance is greater than that sufficient for reaction with both the drying oil and the conjugated double bond resin, this will be immaterial because such excess quantity will generally be driven off in the heating of the reacting substances.

From the preceding, it is seen that of the three reactable substances previously discussed, the quantity of the drying oil with respect to the combined amount of double bonded diene reactive substance and the conjugated double bond resin, and the amount of such double bonded diene reactive substance with respect to the conjugated double bond resin, determine the properties of the resultant modified drying oil. A relatively large quantity of the drying oil should be used with respect to the combined amount of double bonded diene reactive substance and the conjugated double bond resin, yet such quantity of drying oil should not be so great as to cause the modification effect on the oil to become negligible. We have found that although the limits of the quantity of the drying oil with respect to the total quantity of the other reacting substances are not critical, there should be at least from two and one half (2½) to seven (7) parts of drying oil with respect to the combined quantity of double bonded diene reactive substance and the conjugated double bond resin; the ratio being on the basis of parts by weight. In this connection, it is essential that the reaction of the latter substances be conducted in the presence of the drying oil to provide the results of our invention because reaction of these substances alone to produce an artificial resin, with subsequent attempt to react the resultant resin with the drying oil, will not provide the results of our invention.

With respect to a felt base floor covering print paint for which the modified drying oil of our invention is particularly adapted because of the increased toughness or hardness, and flexibility which it imparts to the resultant coating, compared to that obtainable by employing as the vehicle a like quantity of an unmodified drying oil of the same kind having an equivalent quantity of unreacted resin incorporated therein, it is desirable that the paint in which the oil forms the vehicle, have the proper degree of thioxotropy, i. e., the property of being sufficiently non-viscous so as not to stick to the printing blocks by which it is applied, and yet be sufficiently cohesive so that the margins of the paint patterns applied by the printing blocks will not run. Otherwise, the paint design would be unsatisfactory. This is particularly important when it is considered that during and after application of the paint patterns to felt base floor covering, the covering is moved about rapidly; and it is generally suspended vertically upon entering the drying racks. Such movements have a tendency to cause the paint to run; and unless it has the proper degree of cohesiveness, the margins of the various patterns would intermix. Thus, it is seen that a felt base floor covering print paint presents a different problem than ordinary paints and varnishes where thixotropy is not such a vital factor.

The reaction products of a drying oil, a double bonded diene reactive substance, and a conjugated double bond resin, are relatively highly acid, which is undesirable where thixotropy is desired as is the case with respect to a print paint, because the greater the acidity the less the thixotropic effect. To neutralize such acidity, and obtain the desired amount of thixotropy, we preferably include an alcohol in the reaction of the previously described substances. Monohydric alcohols may be employed but are not desirable because of their relatively low boiling points, which would result in their boiling off during the reaction unless great care were taken. Consequently, polyhydric alcohols are preferred because of their higher boiling points. Preferably, glycerol is employed as the neutralizing polyhydric alcohol, but other alcohols, such as those previously mentioned, may be utilized. Reduction of acidity is also desirable because the customary print paint pigments when mixed in the oil may react with the oil if it is too highly acid, which might prove detrimental.

Too much of the polyhydric alcohol should not be employed in the reaction, because if the acidity is reduced too great in extent, the mass may become too rubbery or viscous which would be undesirable for a relatively non-viscous modified floor covering drying oil vehicle at which our invention aims. Also, there should not be too large an excess of the double bonded diene reactive substance with respect to the alcohol because the reaction between such excess and the alcohol may also render the resultant modified drying oil too viscous or rubbery for practical purposes. For best results, sufficient of the polyhydric alcohol should be employed to reduce the acidity to an acid number of between twenty (20) and thirty (30), according to the conventional alcoholic KOH (potassium hydroxide) method for determining acid value of resinous materials.

The modified drying oils of our invention are adapted to be mixed with the usual solvents, driers, and pigments employed in floor covering print paints, and when applied to a surface, they provide a more flexible and tougher film after drying thereof, than the resultant film which would occur by the employment of an unmodified oil having an equivalent quantity of unreacted resin incorporated therein. Also, because of the increased drying properties which are imparted to the oil by virtue of the reaction therewith of the substances previously described, oils of less drying properties, such as soy-bean oil, are rendered available, instead of the customary oils heretofore employed having greater drying properties, such as linseed oil. This usually results in an economy because the oils with lesser drying properties are generally cheaper than those of greater drying properties. In this connection, the reaction of China wood or tung oil with the substances referred to may not provide a satisfactory modified print paint oil because the resultant modified oil has a tendency to jell, and wrinkle on baking.

Not only are the modified oils of our invention particularly adapted for use as vehicles for felt base floor covering print paint coatings because of the flexibility, and toughness or hardness of the resultant film, but for the same reason they may be used to great advantage as seal coating vehicles for such felt base floor coverings. Seal coatings are applied over the surface of the asphalt impregnated felt base to preclude bleeding of the asphalt into the print paint coating applied thereover. The modified oils of our invention may also be employed to advantage as vehicles for linoleum cements in linoleum floor coverings.

The reaction among the substances adapted to form the modified drying oils of our invention, is conducted by application of heat at a sufficiently high temperature to effect the reaction, as is disclosed in the patents previously referred to. The reaction may be conducted in any suitable container; and in applying the heat, the temperature should not be raised too rapidly but should be brought up slowly, approximately to the point of maximum reaction to enhance the reaction and also minimize vaporization of some of the reacting substances. At substantially the temperature where the maximum reactive effect occurs, the temperature should be raised slightly to insure completion of the reaction.

Where the polyhydric alcohol is to be included in the reaction, it should be added just after the point of maximum reaction among the drying oil, the double bonded diene reactive substance, and the conjugated double bond resin to insure esterification of the resultant reactive mass rather than any of such substances alone. The polyhydric alcohol should be added slowly to allow it to enter the reaction with minimum loss thereof; and after addition of the alcohol, the temperature may be raised to insure completion of the reaction, as was previously mentioned. After the polyhydric alcohol is added, the application of heat should be terminated substantially at the time the desired acid number is reached.

The following examples illustrate typical preparations of our modified drying oils adapted for print paint vehicles, the proportions being in parts by weight:

*Example I*

Heat up relatively slowly, i. e., in about one and one-half (1½) hours, two hundred twenty-five (225) parts of soy-bean oil, seventy-five (75) parts of rosin, and sixteen and five-tenths (16.5) parts of maleic anhydride, to about four hundred fifty degrees Fahrenheit (450° F.) to five hundred fifty degrees Fahrenheit (550° F.). At such temperature, slowly add fifteen (15) parts of glycerol. After the glycerol is incorporated, slowly raise the temperature about twenty degrees Fahrenheit (20° F.) to thirty degrees Fahrenheit (30° F.), in about twenty (20) to thirty (30) minutes; and hold such temperature for an acid number of preferably twenty (20) to thirty (30). Then terminate the application of heat.

A print paint film or coating resulting from a print paint containing as the vehicle the modified oil of Example I was compared as to hardness and drying, with a print paint coating resulting from a print paint containing as the vehicle a like quantity of a like unmodified oil composed of two hundred twenty-five (225) parts by weight of soy-bean oil (the same quantity of oil as that in the formula of Example I) having incorporated therein by application of heat a quantity of artificial varnish resin substantially the same as the total quantity of rosin, maleic anhydride and glycerol which entered into the reaction for formation of the modified oil; such artificial resin being a rosin maleic glyceride known as "Teglac Z-152" manufactured by the American Cyanimide Co. Both print paints were formed of one hundred fifty (150) parts by weight of oil as the vehicle, one hundred eighty (180) parts by weight of lithopone, sixty (60) parts by weight of zinc oxide, and fifteen (15) parts by weight of heavy bodied linseed oil, all thoroughly mixed together. Also, a viscosity comparison was made between the modified oil of Example I and the unmodified oil just described with respect to the print paint coating comparison. The following is a tabulation of the results found:

|  | Modified oil | Unmodified oil |
| --- | --- | --- |
| Hardness (Sward) of resultant film | Thirteen (13) | Eight (8). |
| Drying | Good | Fair. |
| Viscosity (cut with thirty per cent (30%) mineral spirits) | A | A. |

Hardness was determined by the conventional Sward rocker hardness test, by applying the rocker to a dried film or coating of the print paint baked on conventional felt base floor covering. In such test, the greater the reading, the greater is the hardness. Drying was determined by feeling the dried film with the finger, and observing the extent of tackiness of such film. Drying is a function of hardness; therefore, the hardness comparison indicates to some extent the difference in drying qualities of the two oils. Toughness is also a function of hardness. Hence, the hardness reading is a measure of toughness. Viscosity was determined by the conventional Gardner Holt viscosity tube apparatus for determining viscosity of varnishes. In such test, the vehicle to be tested is cut with thirty per cent (30%) by weight of mineral spirit solvent which was done with respect to the modified oil and the unmodified oil. The reading A indicates the lightest body in the Gardner Holt viscosity tube scale.

*Example II*

Heat up relatively slowly, i. e., in about two and one-half (2½) hours, one thousand (1000) parts of linseed oil, one hundred twenty-five (125) parts of rosin, and twenty-seven and five-tenths (27.5) parts of maleic anhydride, to about four hundred twenty-five degrees Fahrenheit (425° F.) to five hundred twenty-five degrees Fahrenheit (525° F.). At such temperature, slowly add twenty-five (25) parts of glycerol. After the glycerol is added, slowly raise the temperature about forty degrees Fahrenheit (40° F.) to fifty degrees Fahrenheit (50° F.), in about thirty (30) to forty (40) minutes; and hold such temperature for an acid number of preferably twenty (20) to thirty (30). Then, terminate the application of heat.

As with respect to Example I, a coating resulting from a print paint containing as the vehicle the modified oil of Example II was compared as to hardness and drying with a coating resulting from a print paint containing as the vehicle a like quantity of a like unmodified oil having incorporated therein by application of heat a quantity of the same artificial resin referred to in Example I, in an amount equivalent to the total quantity of the substances reacted with the oil to modify it. The formula for the print paint was the same as that employed in the Example I comparison. Also the same viscosity comparison was made between the modified oil of Example II and a like unmodified oil having an equivalent quantity of unreactive resin incorporated therein. Like comparisons were also made with respect to each of the modified oils of the succeeding examples, and hence will not be referred to again in detail, except for the tabulation of the data determined. The data for Example II are as follows:

|  | Modified oil | Unmodified oil |
| --- | --- | --- |
| Hardness (Sward) of resultant film | Twelve (12) | Ten (10). |
| Drying | Very good | Good. |
| Viscosity (cut with thirty per cent (30%) mineral spirits) | A | A. |

Example III

Heat up relatively slowly, i. e., in about two (2) hours, four hundred fifty (450) parts of cottonseed oil, one hundred (100) parts of rosin, and sixteen (16) parts of maleic anhydride, to about four hundred fifty degrees Fahrenheit (450° F.) to five hundred fifty degrees Fahrenheit (550° F.). At a reduced temperature of about four hundred degrees Fahrenheit (400° F.) to four hundred fifty degrees Fahrenheit (450° F.), slowly add fifteen (15) parts of glycol; the reduction in temperature being desirable with respect to glycol to minimize vaporization because it is more volatile than glycerol. After the glycol is added, slowly raise the temperature in about fifty (50) to sixty (60) minutes, to about five hundred twenty-five degrees Fahrenheit (525° F.) to five hundred seventy-five degrees Fahrenheit (575° F.); and hold such temperature for an acid number of preferably twenty (20) to thirty (30). Then, terminate the application of heat.

Comparison of the modified oil with a like amount of unmodified oil having an equivalent quantity of unreactive resin incorporated therein:

|  | Modified oil | Unmodified oil |
| --- | --- | --- |
| Hardness (Sward) of resultant film | Eleven (11) | Eight (8). |
| Drying | Good | Fair. |
| Viscosity (cut with thirty per cent (30%) mineral spirits) | A | A. |

Example IV

Heat up relatively slowly, i. e., in about two and one-half (2½) hours, nine hundred sixty (960) parts of walnut oil, one hundred seventy-five (175) parts of rosin, and sixty-six and five-tenths (66.5) parts of fumaric acid, to about four hundred twenty-five degrees Fahrenheit (425° F.) to five hundred fifty degrees Fahrenheit (550° F.). At a reduced temperature of about three hundred seventy-five degrees Fahrenheit (375° F.) to about four hundred seventy-five degrees Fahrenheit (475° F.), slowly add forty-four (44) parts of glycol. After incorporation of the glycol, slowly raise the temperature in about fifty (50) to sixty (60) minutes, to about five hundred twenty-five degrees Fahrenheit (525° F.) to five hundred seventy-five degrees Fahrenheit (575° F.); and hold such temperature for an acid value of preferably twenty (20) to thirty (30). Then, terminate the application of heat.

Comparison of the modified oil with a like amount of unmodified oil having an equivalent quantity of unreactive resin incorporated therein:

|  | Modified oil | Unmodified oil |
| --- | --- | --- |
| Hardness (Sward) of resultant film | Twelve (12) | Ten (10). |
| Drying | Very good | Fair. |
| Viscosity (cut with thirty per cent (30%) mineral spirits) | A | A. |

Example V

Heat up relatively slowly, i. e., in about one and one-half (1½) hours, three hundred (300) parts of corn oil, sixty (60) parts of rosin, and thirteen and five-tenths (13.5) parts of maleic anhydride, to about four hundred fifty degrees Fahrenheit (450° F.) to five hundred fifty degrees Fahrenheit (550° F.). Then, slowly raise the temperature about twenty-five degrees Fahrenheit (25° F.) to fifty degrees Fahrenheit (50° F.), in about thirty (30) to forty-five (45) minutes and maintain such temperature to completion of the reaction; and upon completion of the reaction, terminate the application of heat.

Comparison of the modified oil with a like amount of unmodified oil having an equivalent quantity of unreactive resin incorporated therein:

|  | Modified oil | Unmodified oil |
| --- | --- | --- |
| Hardness (Sward) of resultant film | Ten (10) | Eight (8). |
| Drying | Good | Fair. |
| Viscosity (cut with thirty per cent (30%) mineral spirits) | A | A. |

Example VI

Heat up relatively slowly, i. e., in about two and one-half (2½) hours, nine hundred forty-five (945) parts of linseed oil, one hundred thirty-five (135) parts of rosin, and fifty-two (52) parts of fumaric acid to about five hundred degrees Fahrenheit (500° F.). Slowly add about forty and five-tenths (40.5) parts of glycerol. After the glycerol is added, raise the temperature slowly to about five hundred fifty degrees Fahrenheit (550° F.) to five hundred seventy-five degrees Fahrenheit (575° F.), in about twenty (20) to thirty (30) minutes; and hold such temperature for an acid number of preferably twenty (20) to thirty (30). Then, terminate the application of heat.

Comparison of the modified oil with a like amount of unmodified oil having an equivalent quantity of unreactive resin incorporated therein:

|  | Modified oil | Unmodified oil |
| --- | --- | --- |
| Hardness (Sward) of resultant film | Fourteen (14) | Ten (10). |
| Drying | Very good | Fair. |
| Viscosity (cut with thirty per cent (30%) mineral spirits) | A | A. |

From the above comparisons, it is to be noted that the modified drying oils of our invention provide in all cases a harder, tougher, and less tacky print paint film or coating than the unmodified oil having an equivalent amount of unreacted resin therein. Even though these advantageous results are obtained, the body of the modified oil is no heavier than that of the unmodified oil. With respect to flexibility, we have found that even though greater hardness of the resultant film occurs, the flexibility is just as good as or even better than that of unmodified oil film. In all of the above examples, any of the conventional thinners, such as mineral spirits, and any of the conventional driers, such as manganese naphthanate may be incorporated in the modified drying oil as needed, to thin it, and accelerate drying of the vehicle, respectively. The quantities of thinner and drier that may be incorporated, may be the same as are usually employed in print paint vehicles.

Incorporation of the polyhydric alcohol offers the problem of vaporization of the alcohol. To minimize such vaporization and thus reduce loss of the alcohol, and also save time for effecting the reaction in the examples previously referred to, it is desirable and preferred to form beforehand an ester of the polyhydric alcohol and some of the drying oil, by slowly heating approximately stoichiometric quantities of the oil and the alcohol to the point where their reaction is completed, which can be ascertained when all the material is soluble in absolute methyl alcohol.

The resultant ester may then be incorporated with the other reactable substances after such substances have been brought up to the desired temperature. When an ester of the oil and the alcohol is formed beforehand, the quantity of drying oil employed to react with the double bonded diene reactive substance, and the conjugated double bond resin, will be less to the extent of oil employed to form such ester.

The following example is that of our preferred floor covering print paint vehicle which is now being employed by our assignee, and in which a monoglyceride of the oil and glycerol is formed beforehand. The parts are by weight.

Example VII

Heat up slowly in about two (2) to two and one-half (2½) hours, about eighty-one (81) parts of soy-bean oil and nineteen (19) parts of glycerol, to about five hundred twenty degrees Fahrenheit (520° F.), which temperature is held for about one hour and then raised slowly in about ten (10) to twenty (20) minutes, to about five hundred forty degrees Fahrenheit (540° F.). Such temperature is held until the reaction is completed, which can be ascertained when all the material is soluble in methyl alcohol. The resultant product is a monoglyceride of soy-bean oil. If desired, any suitable catalyst, such as one-tenth per cent (0.1%) to two-tenths per cent (0.2%) of sodium acetate based on the weight of oil, may be employed to speed up the reaction for formation of the monoglyceride.

Heat up slowly in about one and one-half (1½) hours, about five hundred seventy-six (576) parts of soy-bean oil, one hundred eighty (180) parts of rosin, and forty (40) parts of maleic anhydride, to about five hundred degrees Fahrenheit (500° F.). Hold such temperature for about ten (10) minutes to insure completion of the reaction among the oil, rosin and maleic anhydride, and then add slowly one hundred seventy-four (174) parts of the previously formed monoglyceride. After incorporation of the monoglyceride, raise the temperature to about five hundred seventy degrees Fahrenheit (570° F.), and hold at that temperature until the reaction is complete, which will be about two (2) hours. Then, terminate the application of heat.

When the resultant modified oil has cooled to a temperature of about four hundred degrees Fahrenheit (400° F.), it is then preferably thinned with about four hundred fifty (450) parts of mineral spirits; and eight (8) parts of six per cent (6%) manganese naphthanate drier are preferably added.

Comparison of the modified oil with a like amount of unmodified oil having an equivalent quantity of unreactive resin incorporated therein:

|  | Modified oil | Unmodified oil |
| --- | --- | --- |
| Hardness (Sward) of resultant film | Thirteen (13) | Nine (9) |
| Drying | Good | Fair. |
| Viscosity (cut with thirty per cent (30%) mineral spirits) | A | A. |

The usual print paint pigments such as zinc oxide, and lithopone, fillers such as crushed limestone, and heavy bodied oil such as linseed oil bodied together with litharge, may be incorporated in the usual manner in the modified oil vehicle of our invention to provide the final print paint.

We claim:

1. A relatively non-viscous felt base floor covering print paint vehicle comprising the products resulting from the reaction of the following substances in parts by weight:

| | |
|---|---|
| Soy-bean oil | About five hundred seventy-six (576) |
| Rosin | About one hundred eighty (180) |
| Maleic anhydride | About forty (40) |
| Monoglyceride formed by the reaction of about eighty-one (81) parts by weight of soy-bean oil and nineteen (19) parts by weight of glycerol | About one hundred seventy-four (174) |

2. The method of making a relatively non-viscous modified drying oil which comprises reacting a polyhydric alcohol and a drying oil; reacting an additional quantity of such drying oil with a double bonded diene reactive substance, and a conjugated double bond resin; and then reacting the resultant reaction products.

3. The method of causing an alcohol to enter into a reaction with a drying oil, a double bonded diene reactive substance, and a conjugated double bond resin, which comprises forming a reaction product of the alcohol with the drying oil, and reacting the resultant reaction product with an additional quantity of the drying oil, the double bonded diene reactive substance, and the resin.

SAMUEL A. COHEN.
CHARLES D. THURMOND.
LEE S. READ.